United States Patent [19]

La Monica

[11] 3,864,071
[45] Feb. 4, 1975

[54] PIZZA PIE MAKING APPARATUS AND METHOD
[76] Inventor: Luigi La Monica, 1533 85th St., Brooklyn, N.Y. 11228
[22] Filed: Apr. 3, 1973
[21] Appl. No.: 347,476

[52] U.S. Cl...................... 425/470, D7/43, 249/176
[51] Int. Cl............................................. A21c 11/12
[58] Field of Search ............ 425/470, 458; 249/176, 249/DIG. 1; D7/43, 85

[56] References Cited
UNITED STATES PATENTS
| | | | |
|---|---|---|---|
| 2,174,425 | 9/1939 | Schlumbohm | 249/DIG. 1 |
| 2,650,552 | 9/1953 | Wood | 269/302.1 X |
| 3,328,847 | 7/1967 | Trogdon | 249/176 X |
| D117,346 | 10/1939 | Brickley | D-7/43 |

Primary Examiner—Roy Lake
Assistant Examiner—DeWalden W. Jones
Attorney, Agent, or Firm—Flynn & Frishauf

[57] ABSTRACT

A pizza pie making apparatus and method wherein the apparatus has a generally flat surface for receiving pie dough thereon, and a plurality of projections extending upwardly from the flat surface, the projections being distributed over a substantial portion of the flat surfaces. The projections extend from the flat surface by an amount which is less than the thickness of the pie to be made from the dough, and engage the pie dough during the forming thereof to prevent shrinkage. Preferably, a trough is formed around the periphery of the flat surface for receiving dough therein, to thereby form the edges of the crust. Upwardly extending peripheral lips and legs are preferably provided to enable convenient stacking of the pie making devices.

19 Claims, 7 Drawing Figures

PATENTED FEB 4 1975 3,864,071
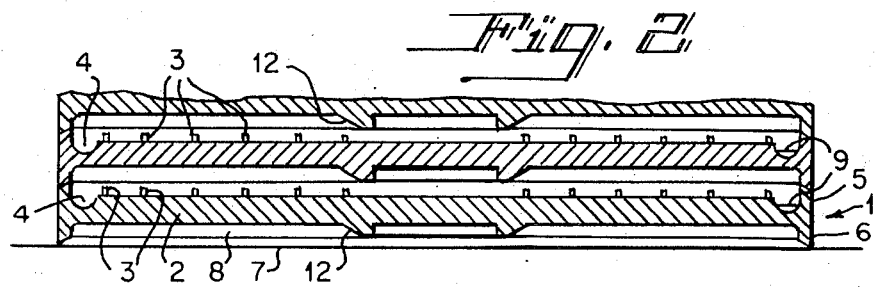
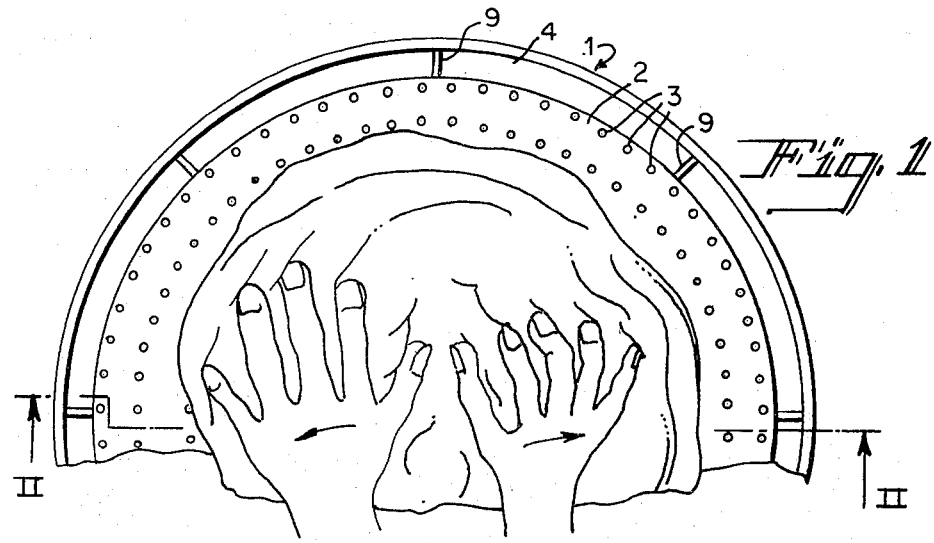
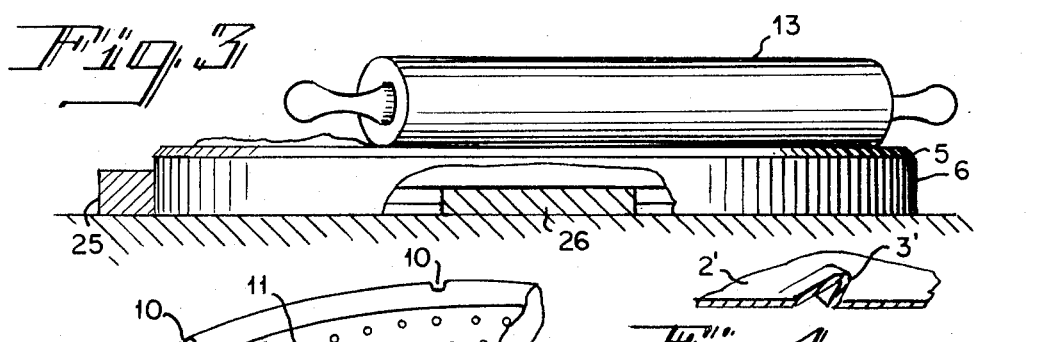
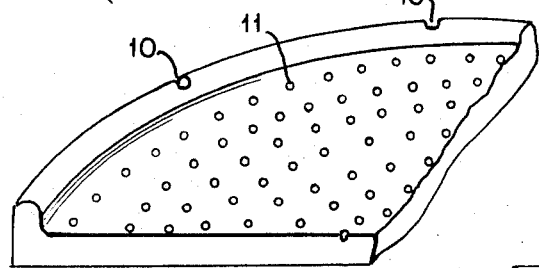
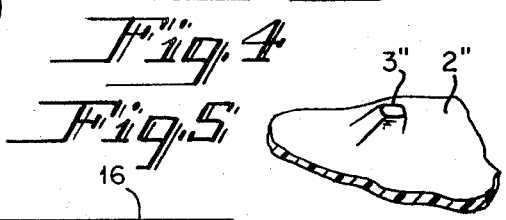
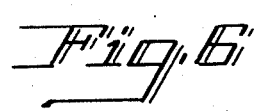
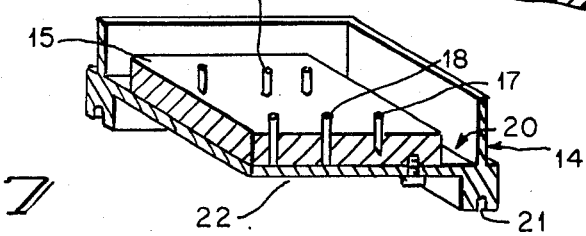

PIZZA PIE MAKING APPARATUS AND METHOD

The present invention relates to pizza pie making devices and methods, and more particularly to a device and method for forming the pie crust of pizza pie.

Generally, fresh pizza pies are made by relatively skilled personnel who shape the pie crust individually and generally immediately before baking of the pie. After a pizza pie crust is formed, it generally tends to shrink to a great degree. Twirling of the pie crust before putting the topping and condiments thereon generally relieves much of the internal stresses in the pie crust and reduces the amount of shrinkage. However, such operations require skilled personnel in order to make a high quality pizza.

Due to the shrinking problem, it is not possible to fabricate the pizza pie crust far in advance. Moreover, if pie crusts are formed far in advance, they tend to dry out, thus producing pizza pies of poor quality.

The main object of the present invention is to overcome the drawbacks of the prior art, while also enabling a high quality pizza to be fabricated by relatively unskilled personnel.

SUMMARY OF THE INVENTION

In accordance with the present invention, a pie making device, preferably for a pizza pie, comprises a generally flat surface for receiving pie dough thereon. A plurality of projections extend from the flat surface and are distributed over a substantial portion of the flat surface. The projections extend from the flat surface by an amount which is less than the thickness of the pie to be made from dough. Preferably, no projections are provided at the central portion of the flat surface, the dough being initially placed at said central portion.

In a preferred embodiment, a trough is formed around the periphery of the flat surface for receiving dough therein. The trough forms the edges of the crust for retaining the topping and condiments of the pie within the confines thereof.

According to a further preferred feature of the invention, the pie making device comprises an upwardly extending peripheral lip which extends above the flat surface by a distance which is substantially equal to the thickness of the pie crust to be formed. According to still another preferred feature, the device includes downwardly extending peripheral legs which raise the device off of the working surface and which engage the upper peripheral lip of another device. In this manner, the devices are stackable while also providing room for the pie to rise during standing.

The projections are preferably flat-topped, and may take any desired form which is suitable for retaining the dough against shrinkage during working of the dough and during standing.

BRIEF DESCRIPTION OF THE DRAWINGS

FIG. 1 illustrates a round pizza pie making device according to the present invention and its method of use;

FIG. 2 is a cross sectional view of the embodiment of FIG. 1, also showing two additional units stacked on each other;

FIG. 3 illustrates the use of the device of FIG. 1 with a rolling pin for spreading the dough;

FIGS. 4 and 5 illustrate various types of projections for use in the present invention;

FIG. 6 illustrates a portion of the pie crust formed using the embodiment of FIG. 1; and FIG. 7 shows a modified embodiment for forming a generally rectangular pie crust.

DETAILED DESCRIPTION OF PREFERRED EMBODIMENTS

Referring to FIGS. 1 and 2, there is shown a pizza pie making device of the present invention for making a round pizza pie crust. It should be apparent that the device may be formed in any desired shape to make pizza pie crusts of any desired shape.

The pizza pie making device 1 comprises a horizontally extending portion 2 having an upper flat surface and a plurality of projections 3 extending from the upper flat surface. The flat surface is generally round, as shown in FIG. 1, and a trough 4 is formed around the periphery thereof. The device further includes an outer peripheral lip 5 which extends above the upper flat surface of horizontally extending member 2 by an amount which is substantially equal to the thickness of the pie crust which is to be formed. Peripheral lower legs 6 are provided which rest on a work surface 7 during use. The legs 6 extend downward from the lower surface of the horizontally extending member 2 so as to provide a space 8 as shown in FIG. 2. The purpose of the space 8 will be discussed hereinbelow.

The projections 3 are distributed over the surface of the horizontally extending member 2. The central portion of the horizontally extending member 2 has no projections thereon. This is the portion on which the ball of dough is initially layed when a pizza pie crust is to be formed, and it has been found that it is unnecessary to provide such projections at the central portion. The projections 3 preferably extend very close to the peripheral edge of the flat upper surface of horizontally extending member 2 so as to provide firm engagement of the dough to prevent shrinking during standing.

At predetermined positions in the trough 4 are located elements 9 which create markings to mark the positions at which the pie is to be cut after baking. The elements 9 preferably extend only about ½ the height of the trough 4, so that the peripheral portion of the crust still remains at a height high enough to prevent the topping of the pizza pie from passing off of the pizza pie, but still provide a sufficient visual indication of where the operator is to cut the pizza pie. In this regard, see FIG. 6 which illustrates the depressions 10 formed in the pizza pie crust by means of the elements 9 located in the trough. This insures substantially equal portions when serving the pie.

As seen in FIG. 1, the device of the present invention is used as follows: the ball of dough is placed in the middle portion of the tray. The operator then kneads the dough and continuously pushes same outward toward the edge of the flat upper surface 2. Since the upper surface of the projections 3 are substantially flat or blunt, there is no danger to the operator even if the projection should pierce through the dough during use. However, the projections are formed low enough so that sufficient holding strength is provided, while also providing sufficient clearance in order to prevent the projections from piercing through the dough during use. The dough is continually pushed out and the edge portions are pressed into the trough 4. After completion of the operation, the dough is ready for removal from the tray for producing a pizza pie. This is done merely by peeling the dough off of the tray and inverting same so that the edge portions formed by the trough 4 are directed upward. See FIG. 6. Then the topping and condiments are placed on the pie in the normal manner and it is baked. The depressions 11 (FIG. 6) formed in the upper surface of the dough during forming of the pie provide for more even distribution of the topping and condiments of the pizza pie than has been heretofore obtainable. The result is a better quality pizza pie.

In accordance with another aspect of the present invention, the devices 1, also referred to as trays 1, are stackable as shown in FIG. 1. By virtue of the upwardly extending peripheral lips 5 and the downwardly extending legs 6, which engage the lips 5, trays can be stacked in a substantially air tight manner. After a pie crust is formed as described above with respect to FIG. 1, the pie crust generally extends to the upper edge of the upwardly extending lip 5. However, when a pie stands for any substantially period of time, the dough tends to rise. By providing the legs 6, a space is formed when the trays are stacked between the upper surface of the pie and the lower surface of the horizontally extending member 2 of the upper tray. This allows sufficient room for rising of the dough during standing. By virtue of the tight seal between the legs of the upper tray and the upwardly extending lip 5 of the lower tray, the dough is prevented from drying out during standing, thus preventing deterioration of the dough.

Preferably, as shown in FIG. 2, the lips 5 and legs 6 have inclined surfaces which mate with each other so as to provide a more stable structure when a plurality of trays are stacked, for example as shown in FIG. 2. Other engagement arrangements may be provided, as is convenient, such as other interlocking shapes.

Since the space 8 is provided below the horizontal member 2, it is desirable to provide a central support 12, which may comprise a plurality of downwardly extending projections and/or an annular section as shown in FIG. 2. The main requirements of the support 12 is to prevent excessive flexing of the horizontally extending member 2 when the dough is being kneaded.

As shown in FIG. 3, the upper surface of the lip 5 may serve as a thickness gage for producing pie crusts of pretermined thickness, for example by using a rolling pin 13. The rolling pin will bear upon the upper surface of the lip 5 and will thus form the crust to the desired thickness, as should be apparent.

As also should be apparent, the projections or hook members 3 may take any desired form. FIG. 4 illustrates a typical hook member 3' formed, for example, in a horizontally extending member 2'. The projections 3' may be formed by either punching (when the member 2' is metal) or by molding (when the member 2' is either metal or plastic). FIG. 5 illustrates another form of hook member 3'' formed in a horizontally extending member 2'''. Again, this member 3'' may be formed by molding or punching.

It should be clear that the tray of the present invention can be made from various types of materials, such as metal, plastics, or the like. The specific material from which the tray is constructed it not critical.

FIG. 7 illustrates another embodiment of the invention which is fabricated from a tray 14 to which is secured an inner horizontally extending member 15. The tray 14 may be made of metal, plastic, or the like, and the tray 15 may also be formed of any type of material, including wood. The projections 16 may be merely pierced into the member 15, as shown by projection 17, or may be extending all the way through the member 15, as shown by projection 18 in FIG. 7. The horizontally extending member 15 may be formed integral with the outer member 14, or may be secured thereto by means of nails or screws 19 or adhesives. An outer peripheral trough 20 is formed between the outer wall of the member 14 and the outer peripheral edge of the inner member 15. The outer peripheral edge of the member 14 extends above the upper surface of the member 15 and generally defines the thickness of the pie crust to be formed. The trays of FIG. 7 are stackable as are the trays of FIGS. 1 and 2. The upper edge of the outwardly extending lip of member 14 is engageable with a trough 21 formed in the lower edge of the tray stacked thereon. This provides firm engagement and a substantially air tight arrangement between adjacent trays. The tray 14 has a downwardly extending lip which defines a space 22 between the horizontally extending surface thereof and the work surface. As mentioned above with respect to FIG. 2, the space 22 allows for rising of the dough when the trays are stacked.

In the making of pizza, it is desirable to allow the dough to rise somewhat before putting the topping and condiments thereon and before baking thereof. When the pie has risen, it is possible to produce a high quality pizza when using less cheese, or the like, thereon. It has been found that the dough, after rising, enables the cheese to spread and bake better and therefore, less cheese can be used to provide a high quality product. Such effects have not been obtainable in the prior art since if the dough was allowed to stand in order to rise, it would dry out. The present invention not only provides a new and unique way of making pizza pie crust, but also provides an arrangement which enables the pie crust to rise without drying out, and which enables the pie crust to be made far in advance by relatively unskilled operators. This greatly increases the efficiency of a pie making operation, especially in restaurants where fast service is required.

The troughs 4 of the embodiment of FIGS. 1 and 2, and the trough 20 of the embodiment of FIG. 7 can be made in any desired shape. This should be apparent to those skilled in the art. The main requirement is that the trough be of sufficient height and width so as to retain the topping and condiments within the confines of the pie during further handling and baking.

In certain instances, depending upon the surface on which the device of the present invention is to be used, the device may undesirably move on the work surface. In accordance with a further aspect of the present invention, a support or retaining means can be provided on the work surface such as, for example, the work surface of the table on which the pizza pies are made. Such a retaining or support means 25 is illustrated in FIG. 3. The member 25 may be merely a piece of wood, or the like, secured to the work surface against which the device is abutted during use thereof. When spreading the dough, the pressure is applied in the direction of the support or retaining member 25. The retaining member 25 may be any shape and may be made of any type of material having sufficient structural strength, as desired and as dictated by the environment in which the invention is to be used. Various modifications to the support or retaining means 25 may be made, as should be apparent.

Instead of providing the downwardly extending projection 12 (FIG. 2) to support the central portion of the flat member 2, it is possible to provide a central support means which is attached to the work surface on which the device of the present invention is placed during use. Such a central support means attached to the work surface is shown, for example, in FIG. 3 by a raised portion 26. In use, the device of the present invention is placed in its proper location on the work surface and over the portion 26 which forms part of the work surface. Portion 26 is dimensioned such that it bears upon the lower surface of member 2 during kneading of the dough. Alternatively, support member 26 may be a separate member, not attached to the work surface, which is merely placed below the horizontally extending member 2 during use. The member 26 may take any desired shape, such as rectangular, disc-shaped, etc., hollow or solid, as long as the necessary structural strength is provided.

It should be clear that various modifications and alterationss can be made to the specific designs described herein within the scope and spirit of the present invention as defined in the appended claims. For example, the materials from which the device is made may be varied and the specific shapes of the devices and of the various constituent elements thereof may also be varied. The various modifications available should be apparent to one ordinarily skilled in the art.

I claim:

1. A pie crust making and retaining device comprising:
    a generally flat surface for receiving pie dough thereon;
    means for piercingly engaging and preventing shrinkage of said pie dough, said engaging and shrinkage preventing means including a plurality of spaced projections extending from said flat surface and being distributed over a substantial portion of said flat surface, said projections extending from said flat surface by an amount which is less than the thickness of the pie crust to be made from said dough and maintaining said dough in its formed condition; and
    forming means at the outermost portion of said pie crust making device for forming a raised edge of the dough relative to the flat surface at least around the periphery of said flat surface.

2. A pie making device according to claim 1 wherein said forming means includes a peripheral trough formed around the periphery of said flat surface for receiving pie dough therein, said trough forming a raised edge on the completed pie crust.

3. A pie making device according to claim 2 wherein said forming means further comprises an upwardly extending lip surrounding said trough and extending above the flat surface by an amount which is substantially equal to the thickness of the pie crust to be formed.

4. A pie making device according to claim 3 comprising peripheral leg means extending around the outer portions of said trough for raising said flat surface, said leg means being engageable with the upwardly extending lips of another pie making device to enable stacking thereof, with a clearance between the flat surface and the upper surface of a pie crust formed in the next lower device.

5. A pie making device according to claim 4 wherein the upper edge of said lip and the lower edge of said leg means have interengaging surface configurations.

6. A pie making device according to claim 4 wherein the upper edge of said lip and the lower edge of said leg means are inclined in the same direction so as to interengage each other.

7. A pie making device according to claim 2 wherein said troughs include raised members therein for making an impression in the dough received in said trough for marking cutting points of said pie crust.

8. A pie making device according to claim 2 wherein the central portion of said flat surface has no projections extending therefrom.

9. A pie making device according to claim 2 wherein said projections have substantially flat tops.

10. A pie making device according to claim 2 wherein said projections have blunt tops.

11. A pie making device according to claim 2 wherein said projections have angularly extending surfaces which extend upward from said flat surface and away from the central portion of said flat surface.

12. A pie making device according to claim 2 further comprising fixed means adapted to abut against said device for maintaining said device in a fixed position during use thereof.

13. A pie making device according to claim 2 comprising means extending downwardly from said flat surface for supporting said flat surface during use.

14. A pie making device according to claim 13 wherein said supporting means comprises an annular ring extending downwardly from said flat surface.

15. A pie making device according to claim 4 wherein said leg means comprises a continuous skirt extending downwardly from the outer peripheral portions of said device.

16. A pie making device according to claim 1 comprising a lower flat surface having upwardly extending edges, and a second flat surface extending upwardly from said lower flat surface and extending inwardly from said edges of said lower flat surface so as to form a trough between said edges and said second flat surface, said projections extending from said second flat surface.

17. A pie making device according to claim 2 comprising a central support below said flat surface for supporting the central portions of said flat surface during use.

18. A pie making device according to claim 17 wherein said central support is attached to a work surface on which said pie making device is to be used.

19. A pie making device according to claim 1 wherein said projections are inclined toward the periphery of said pie making device.

* * * * *

UNITED STATES PATENT OFFICE
CERTIFICATE OF CORRECTION

PATENT NO. : 3,864,071
DATED : February 4, 1975
INVENTOR(S) : Luigi Lamonica

It is certified that error appears in the above-identified patent and that said Letters Patent are hereby corrected as shown below:

Change inventor's name to read:

--Luigi Lamonica--.

Signed and sealed this 15th day of April 1975.

(SEAL)
Attest:

RUTH C. MASON
Attesting Officer

C. MARSHALL DANN
Commissioner of Patents
and Trademarks